UNITED STATES PATENT OFFICE.

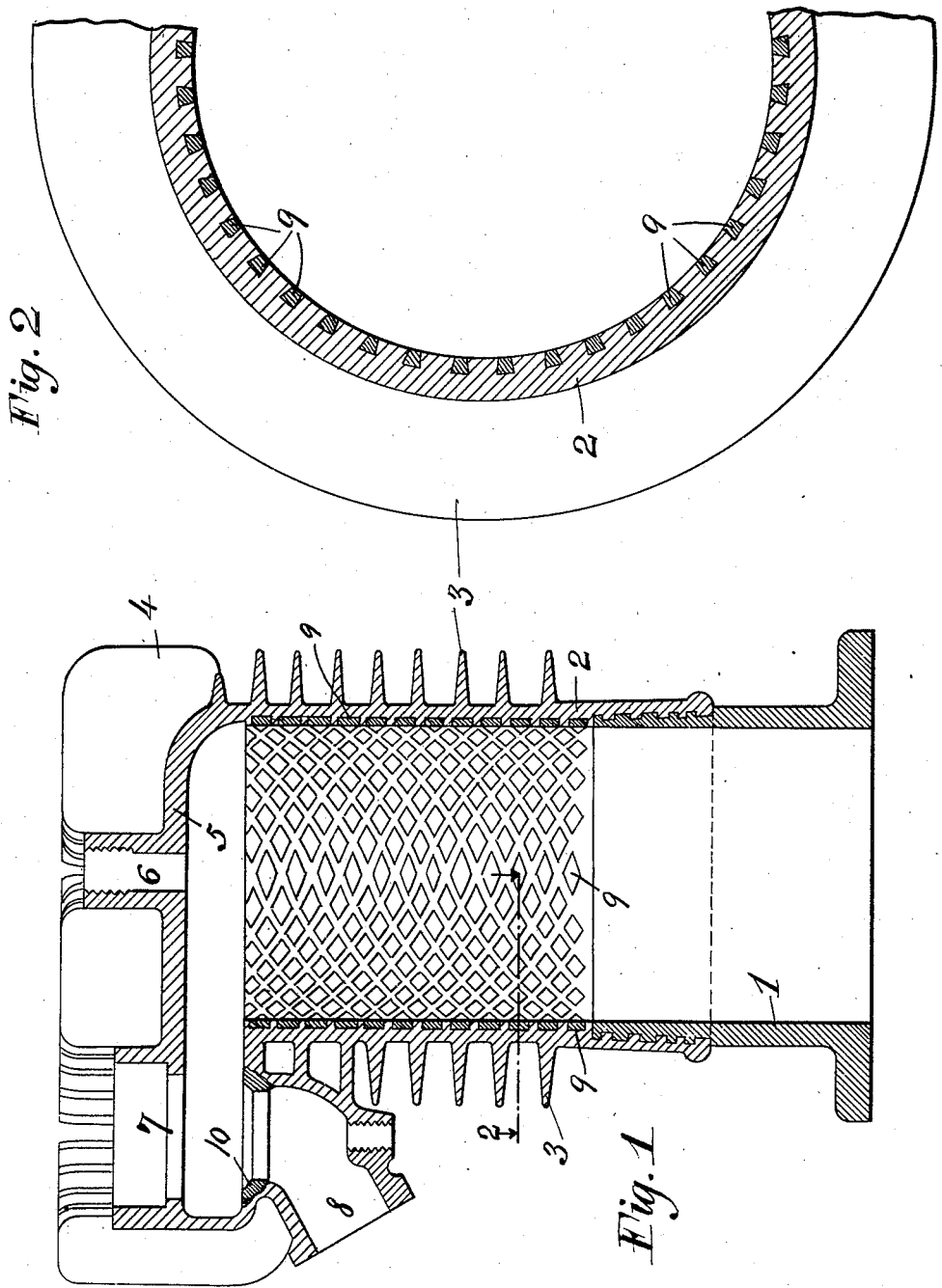

LARS G. NILSON, OF HOBOKEN, NEW JERSEY.

AIR-COOLED COMBUSTION-ENGINE.

1,010,787.      Specification of Letters Patent.      Patented Dec. 5, 1911.

Application filed September 15, 1909. Serial No. 517,949.

*To all whom it may concern:*

Be it known that I, LARS G. NILSON, a citizen of the United States, residing at Hoboken, in the county of Hudson and State of New Jersey, have invented certain new and useful Improvements in Air-Cooled Combustion-Engines, of which the following is a full, clear, and exact specification.

This invention relates to air cooled combustion engines and has particular reference to means whereby greater heat radiating capacity is secured and whereby it is possible to construct lighter engines for a given power than has heretofore been practicable, and also larger sizes of air cooled engines than has heretofore been practicable.

Up to the present time, cast iron has been universally used for gas engine cylinders both air and water cooled, and various attempts have been made to increase the heat radiating capacity of cast iron air cooled cylinders by providing them with metallic flanges of copper, etc., having greater conductivity than cast iron. The difficulty with this construction is to provide a good joint between the two metals, as otherwise the heat from the cast iron is not rapidly conducted to the other metal. In special engines used for automobiles or like purposes where saving of weight is of great importance, attempts have been made to make cylinders of other materials than cast iron, but steel has not been satisfactory on account of poor wearing qualities, and other materials which have been used either become brittle or lose their strength when subjected to heat. For automobile and flying machine purposes where saving of weight as well as simplicity is of great importance small air cooled gas engines have been built, but up to the present time only very small diameter cylinders have been satisfactorily used without water jackets.

I have discovered that at the present time there are a number of bronzes and particularly manganese bronze which are capable of being forged at a red heat, consequently retaining their strength at any temperature a gas engine cylinder is subjected to, while at the same time having a greater heat conductivity than cast iron. I propose to construct air cooled engine cylinders of such bronze, as for instance, a mixture of copper, zinc, manganese and iron, whereby an air cooled cylinder may be produced having a much greater heat conductivity than cast iron, and also of greater strength. In one form of the invention, where the cylinder will be subjected to extraordinary wear, I propose to cast in the bronze body of the cylinder a cast iron or other cylinder especially adapted to withstand wear, so that an entire cylinder can be finished at one operation.

The invention will be more fully understood in connection with the description of the accompanying drawing, wherein—

Figure 1 represents in longitudinal section a cylinder constructed according to a preferred form of the invention; and Fig. 2 is a partial cross section thereof.

1 represents the base of the cylinder which may be of cast iron if desired, as it is not subjected to heat, while 2 represents the upper portion of the cylinder composed of bronze or other alloy or similar material capable of being forged at a red heat and having a conductivity greater than that of cast iron, such as, for instance, what is known as manganese bronze. It has been found by test that the tensile strength of manganese bronze is at least double that of cast iron. The coefficients of expansion of these bronzes and cast iron are not so materially different as to prevent a good joint to be made between the two metals where they are cast together in the manner hereinafter described. The upper portion 2 is provided with integral flanges 3 around the sides and top flanges 4 carried by the head 5, and also is provided with apertures 6 for the spark plug and pet cock, and 7 for the inserting of the valves. The gas passage 8 is for the exhaust.

For certain purposes, especially where a reduction in weight is desired, the entire cylinder may be made of manganese or other suitable bronze. Such a cylinder will be practical when properly lubricated and not used under too severe conditions, but when further wearing qualities are desired, I propose to cast within the body 2 a number of cast iron wearing surfaces as 9, which will be bored with the interior of the cylinder at the same operation. These lugs are preferably diamond or lozenge shaped as shown in Fig. 1, and may be formed of a single casting having undercut grooves as shown in Fig. 2, so that the bronze will flow into the grooves when cast and tightly fasten the wearing surfaces 9. In one sense the cast iron cylinder will really be a lining for the bronze cylinder. The bronze cylinder may be united with the cast iron cylinder by one operation of casting. To effect this, the cast iron cylinder should be machined smooth on the outside, and then have a number of helical grooves cut on its surface, said grooves running both right and left, and crossing each other so as to form a number of diamond or lozenge shaped surfaces 9. The surface of the iron cylinder thus finished may be treated either by electroplating or by brazing so as to acquire a coating of bronze, or other suitable material; I have found such procedure to be highly advantageous since it prevents the cylinder from rusting. The iron cylinder may now be placed in the mold together with the proper cores, and the bronze may be cast to form a cylinder and flanges. It is preferable to pre-heat the cast iron cylinder before the bronze is cast around the same. Such pre-heating promotes the union of the bronze with the cast iron, and when my process is carried out properly, the bronze forms a welding contact with the cast iron. When the cylinder is removed from the mold the cast iron cylinder may now be machined on the inside, thus exposing the bronze on the interior and leaving the lozenge or diamond shaped pieces of iron surrounded by the bronze. The interior of the cylinder will then be integral with the flanges 3. It will thus be seen that joints between the metal parts are avoided, and hence better conductivity of heat secured without any loss of strength. It will be understood that the distance between the iron wearing pieces, should be small enough so as not to interfere with the proper working of the piston rings. The valve seat 10 may be made of iron if desired, and cast in with the bronze, as will be readily understood. By reason of the greater tensile strength of the bronze, as compared with that of cast iron, and further by reason of the greater heat conductivity of bronze, cylinders may be built in larger sizes than when made entirely of cast iron. My invention permits, furthermore, cylinders to be made in small sizes, as for automobiles, motor cycles, flying machines and the like, thus effecting a considerable saving in weight.

It will be obvious that various modifications and changes may be made in the particular design and construction of parts, and I do not restrict myself to the specific construction herein shown, nor to any particular alloy or composition to be used for casting the cylinder.

Having thus described my invention, I declare that what I claim as new and desire to secure by Letters Patent, is,—

1. A gas engine cylinder comprising a casting of a metal other than iron having a heat conductivity greater than that of cast iron and having wearing pieces of a different metal spaced in its integral interior surface.

2. A gas engine cylinder comprising a casting of a metal having a heat conductivity greater than that of cast iron and having spaced wearing pieces of cast iron secured in its integral interior surface.

3. A gas engine cylinder body composed of a copper alloy having a heat conductivity and tensile strength greater than that of cast iron, and having integral external radiating flanges, in combination with interior separated spaced wearing pieces of a different material embedded in said body.

4. An air cooled gas engine cylinder comprising a main body portion composed of a metal having a heat conductivity greater than that of cast iron, external radiating projections integral with said body, and separated wearing pieces of relatively hard material dovetailed into said body portion and flush with the interior surface of said body portion.

5. A gas engine cylinder comprising a body portion of manganese bronze having external integral radiating surfaces, and spirally arranged interior wearing pieces composed of iron having undercut edges united to said casting.

In testimony whereof I affix my signature in presence of two witnesses.

LARS G. NILSON.

Witnesses:
HENRY J. LUCKE,
GEORGE N. KERR.